United States Patent
Garnatz et al.

(10) Patent No.: US 12,282,752 B2
(45) Date of Patent: Apr. 22, 2025

(54) AUTOMATIC DETECTION OF ROBOTIC PROCESS AUTOMATION TRIGGER EVENTS

(71) Applicant: International Business Machines Corporation, Armonk, NY (US)

(72) Inventors: Joel Garnatz, Waconia, MN (US); Zachary A. Silverstein, Georgetown, TX (US); Martin G. Keen, Cary, NC (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 17/994,536

(22) Filed: Nov. 28, 2022

(65) Prior Publication Data

US 2024/0176594 A1    May 30, 2024

(51) Int. Cl.
G06F 9/44 (2018.01)
G06F 8/30 (2018.01)
G06F 16/28 (2019.01)
G06F 40/20 (2020.01)

(52) U.S. Cl.
CPC ............ *G06F 8/315* (2013.01); *G06F 16/285* (2019.01); *G06F 40/20* (2020.01)

(58) Field of Classification Search
CPC ....................................................... G06F 8/315
USPC ....................................................... 717/116
See application file for complete search history.

(56) References Cited

U.S. PATENT DOCUMENTS

| | | | |
|---|---|---|---|
| 8,001,469 B2 * | 8/2011 | Weng ..................... | G06F 8/30 715/708 |
| 8,051,057 B2 | 11/2011 | Abu-Hakima et al. | |
| 8,612,404 B2 | 12/2013 | Bone et al. | |
| 9,111,211 B2 | 8/2015 | Mason et al. | |

(Continued)

OTHER PUBLICATIONS

Florentina, Web Data Extraction With Robot Process Automation. Study on Linkedin Web Scraping Using Uipath Studio, 2020.

(Continued)

*Primary Examiner* — Evral E Bodden
(74) *Attorney, Agent, or Firm* — Garg Law Firm, PLLC; Rakesh Garg; Rakesh Roy

(57) ABSTRACT

An embodiment includes classifying an incoming communication message as having an instruction classification based on a natural language processing (NLP) analysis of the incoming communication message. The embodiment extracts, responsive to classifying the incoming communication message as having the instruction classification, user operations as a workflow dataset. The embodiment clusters the workflow dataset into a task cluster with other similar workflow datasets representative of previously-extracted user operations. The embodiment designates the instruction classification as a trigger event based at least in part on the NLP analysis of the incoming communication message. The embodiment generates a robotic process automation (RPA) bot script that comprises program instructions executable by a processor to cause the processor to perform operations that automate the user operations in response to the trigger event.

20 Claims, 9 Drawing Sheets

(56) References Cited

U.S. PATENT DOCUMENTS

| | | | |
|---|---|---|---|
| 10,038,731 B2 | 7/2018 | Pearl et al. | |
| 10,592,394 B2* | 3/2020 | O'Dowd | G06F 11/3476 |
| 11,095,579 B1* | 8/2021 | de Mazancourt | G06F 40/40 |
| 11,120,217 B2* | 9/2021 | Maes | G06F 9/5038 |
| 11,150,916 B2* | 10/2021 | Liu | G06F 9/4843 |
| 11,200,539 B2* | 12/2021 | Iyer | G06Q 10/0633 |
| 11,314,531 B1 | 4/2022 | Mayer et al. | |
| 11,327,826 B1 | 5/2022 | Shama et al. | |
| 2010/0106547 A1* | 4/2010 | Adi | G06F 8/38 705/7.27 |
| 2022/0019195 A1 | 1/2022 | Yu et al. | |
| 2023/0342167 A1* | 10/2023 | Radkoff | G06F 9/45529 |
| 2024/0126924 A1* | 4/2024 | Pabolu | G06N 20/00 |

OTHER PUBLICATIONS

Senise De Gracia, Natural Language Processing for Human-Robot Interaction, 2020.

Xiao et al., Automated Extraction of Security Policies from Natural-Language Software Documents, SIGSOFT'12/FSE-20, Nov. 10-18, 2012.

Bardaro et al., Parsing Natural Language Sentences into Robot Actions, 2019.

ip.com, Remote Desktop Virtualization System and Method for Robotic Process Automation, Sep. 10, 2021.

ip.com, System and Method to Generate Natural Language Utterances to Operate a Graphical User Interface, Jul. 19, 2021.

ip.com, System and Apparatus for Intelligent Automation, Oct. 12, 2018.

* cited by examiner

AUTOMATIC DETECTION OF ROBOTIC PROCESS AUTOMATION TRIGGER EVENTS

BACKGROUND

The present invention relates generally to robotic process automation. More particularly, the present invention relates to a method, system, and computer program for automatic detection of robotic process automation trigger events.

It is common to use computing devices to perform certain tasks or transactions, such as in the creation of documents and records, managing stored data, and ordering goods and services. In many cases the use of computing devices increases the efficiency of performing a given task or transaction, which has contributed to their increased popularity. However, sometimes inefficiencies exist for certain types of highly repetitive, routine tasks such as tasks involving manual data entry or manual data review. Such tasks are generally inefficient from both a time and cost perspective and may also be deemed a non-ideal allocation of resources for non-cognitive based tasks. For example, such tasks are exposed to human error on many potential levels, such as misapplication of business rules, a mistake in reading information from a first computer application, and/or mistake in entering data into the second computer application.

In recent years, efforts to address such issues have given rise to an emerging technology known as Robotics Process Automation (RPA). RPA is a type of automation in which a software application, often referred to as an RPA platform, mimics a user by performing a series of user operations, usually keyboard and/or mouse inputs. RPA platforms usually allow users to initiate one or more "robots" (usually referred to in shortened form as "bots") to perform such operations according to a "bot script" that lists the user operations the bot should perform. RPA platforms usually include a user interface that allows a user to create bot scripts and view a list of any bot scripts that the user may have previously created. RPA platforms also usually include an interface that allows a user to select a bot script and initiate a bot to perform the selected bot script.

SUMMARY

The illustrative embodiments provide for automatic detection of robotic process automation trigger events. An embodiment includes classifying a first incoming communication message as having an instruction classification based at least in part on a first natural language processing (NLP) analysis of natural language text of the incoming communication message, where the first incoming communication message is addressed to a first user. The embodiment also includes extracting, responsive to classifying the first incoming communication message as having the instruction classification, user operations as a workflow dataset. The embodiment also includes clustering the workflow dataset into a task cluster with other similar workflow datasets representative of previously extracted user operations. The embodiment also includes designating the instruction classification as a trigger event based at least in part on the first NLP analysis. The embodiment also includes generating a robotic process automation (RPA) bot script that comprises program instructions executable by a processor to cause the processor to perform operations that automate the user operations in response to the trigger event. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
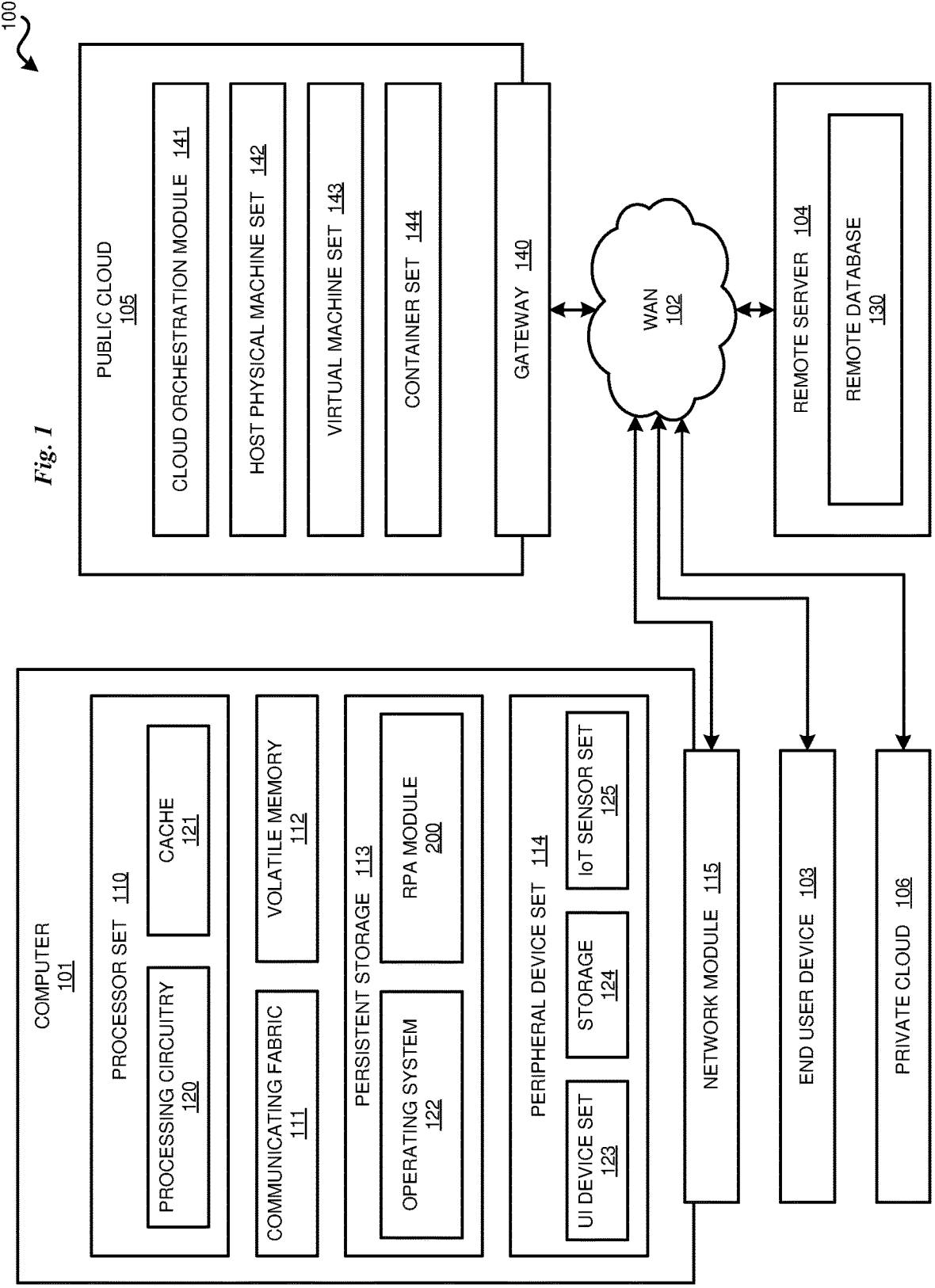
FIG. 1 depicts a block diagram of a computing environment in accordance with an illustrative embodiment.

RPA platforms allow for the creation and execution of "bot scripts," which are program instructions executable by a processor to cause the processor to mimic a user by performing a series of user operations, usually keyboard and/or mouse inputs. RPA technology allows users to create such bot scripts to automate a wide range of tasks that include repetitive operations that the user performs on a computer or other such processing device. RPA platforms also usually allow a user to record a series of operations that the user wishes to automate, making it possible for a user to create a bot script without needing to learn a traditional programming language.

These and other benefits of RPA technology have contributed to its rapid growth since its recent emergence. However, the emergence of RPA technology has also brought with it new problems that have arisen in the realm of RPA automation. For example, new challenges now exist related to how bot scripts can be initiated or "triggered."

Current RPA platforms usually include a user interface that allows a user to manually trigger a bot script, which causes an instance of the RPA platform (referred to as a bot) to perform the operations defined by the bot script. However, this requires the user to remember to trigger the bot script each time it is needed. To address this problem, some RPA platforms allow a user to define a rule or "trigger event" that specifies particular conditions that, when met, will cause the RPA platform to initiate an associated bot script.

In some cases, a trigger event may be relatively simple or straightforward. A simple rule for a trigger event may be a specific time of day for a bot script that the user wishes to run at a particular time every day. Another example of a trigger event may be receipt of an email from a specific email address that has a specific phrase in the subject line. For example, a form on a website may be configured such that each time a visitor submits the form, the server sends the submitted form data as an automated email to the user from a particular email address and with a particular phrase in the subject line. The user may use the specific email address of the sender and the specific phrase of the subject to trigger a bot script to process the form data that may be in the body of the email. A trigger event for an RPA bot script that processes form data in such emails can easily be established since the email is readily identifiable by the RPA platform according to a rule that matches the particular sender email address and the particular phrase that always appears in the subject line.

However, in other cases, it can be very difficult for a user to define a trigger event that will reliably trigger a bot script without significant numbers of misses or false positives. For example, suppose a user frequently receives communication messages that are requests to manually create user accounts on a demo server that allows users to evaluate a server application. The user operations involved in the task of manually creating the user accounts are highly repeatable and could be automated in an RPA bot script. However, the user receives requests to create the user accounts from several different sources, e.g., from potential customers, engineering, sales, etc., through several different channels, e.g., via email, IM, SMS, etc. The requests range from formal to informal with no standard language that is consistently used that would distinguish the requests from all other communication messages. As a result, the user is faced with a technical problem when trying to define a rule that would automatically trigger an RPA bot script in response to such requests.

The disclosed embodiments include address and provide a solution to this technical problem. Exemplary embodiments monitor incoming communication messages (subject to user authorization) and apply one or more data processing techniques of varying degrees of complexity to identify and define messages that appear to be a specific type of request that could serve as trigger event for a bot script. Some exemplary embodiments use artificial intelligence based techniques, such as natural language processing and/or machine-learning algorithms to define a trigger event based on semantic similarities among the different communication messages despite differences in the type, format, and exact wording of the communication messages. This relieves the user of the task of trying to define a trigger event.

In exemplary embodiments, an RPA trigger detection process classifies incoming messages. For example, in some embodiments, the process will analyze incoming communication messages to identify requests, for example using NLP classification. For example, in some embodiments, a binary NLP classification is used to classify incoming messages as having an instruction classification or as not having an instruction classification. In some embodiments, NLP classification is used to classify incoming messages as having one or more of several possible classifications, where the several possible classifications include an instruction classification. Thus, an instruction classification refers to a classification of a communication message that identifies the message as being a type of request or other such instruction to perform a task. An NLP classifier may be trained to recognize communication messages that include a request or other such instruction, for example using training data that includes messages having language that is (or is not) typically indicative of an instruction to perform a task.

In some embodiments, incoming messages that are given the instruction classification are divided into groups or clusters according to what the message is instructing or requesting. For example, a user may receive communication messages requesting or instructing the user to perform one of three possible tasks. The process identifies the types of requests or instructions in each communication message that is classified as an instruction message and groups each message in one of three clusters, where each cluster corresponds with one of the three possible tasks. In some embodiments, the clustering includes k-means clustering using cosine similarity to identify messages that are not worded the same, but have semantically similar meanings.

In some embodiments, to avoid creation of unnecessary script bots for one-time or rarely received requests, a threshold cluster size is established and must be met before task mining for a request cluster. For example, in some embodiments, the specified threshold may be a specified cluster size, such as a threshold size specified by a user or system administrator. In some embodiments, the process may perform statistical significance calculations to determine specified threshold sizes the clusters much reach for maturity. When a request cluster reaches the threshold size, the cluster is flagged as having progressed to the task mining stage. Once a request cluster receives this designation, future requests added to this cluster will trigger task mining.

In some embodiments, if the threshold has been satisfied, the process begins to extract user operations as a workflow dataset. For example, when an incoming communication message is classified as a request and clustered into a matured cluster, the process will monitor user actions subsequent to receipt of the message. The process will generate a workflow dataset representative of the user operations for each monitored request. In some embodiments, the user operations and associated workflow datasets may differ somewhat after each new request in the matured cluster, for example due to anomalous user operations unrelated to the requested task.

In some embodiments, the process uses a task mining technique to extract user operations as workflow datasets. Various task mining techniques are known that monitor multiple iterations of user operations (where each iteration is responsive to a respective request) and gradually identify a core series of user operations that are performed in response to communication messages clustered with the matured cluster.

In an exemplary embodiment, the process clusters workflow datasets into a task cluster with similar workflow datasets. In some embodiments, the process analyzes the workflows and groups them into task clusters using clustering techniques. At this point, the process will recognize any duplicated request clusters and consolidate them into a single task cluster.

In some embodiments, the process determines whether a threshold number of request messages, and the resulting workflow datasets, have been grouped into a task cluster. If so, the process designates a message class as a trigger event, and generates an RPA bot script that performs extracted user operations and is triggered by trigger event. For example, in some embodiments, the process generates trigger event data based on the clustering criteria used for clustering the requests. The workflow information from the task cluster and the trigger event data are used to generate an RPA bot script that comprises program instructions executable by a processor to cause the processor to perform operations that automate the user operations represented by the workflow dataset from the task cluster, where the operations are triggered by the trigger event data that is based on the request clustering criteria. The process then deploys the RPA bot script, for example to a bot repository.

In an exemplary embodiment, the process uses a task mining technique to extract user operations as workflow datasets, while specifically monitoring for the user to send an outgoing message. If an outgoing message is detected, the process will analyze the outgoing communication message to identify whether it is a completion message, meaning a message from the user that appears to convey an indication that a requested task has been completed. For example, in some embodiments, the process uses NLP classification to determine if the message is classified as a completion message. If it is determined to be a completion message, the process designates the outgoing message as termination event.

In an exemplary embodiment, the process uses a task mining technique to extract user operations as workflow datasets, while specifically monitoring for the user to use one or more parameters at any of the extracted operations. For example, if the task is creating a new user account, the parameters may include the user's name, email address, and phone number that are needed to create the account. Thus, the parameters may be any type of information that is needed to complete the task. If parameters are detected, then the process generates metadata for the bot script indicating that one or more parameters are required.

In an exemplary embodiment, the process classifies incoming messages. For example, in some embodiments, the process will analyze incoming communication messages to identify requests that match a trigger event associated with a deployed bot script. If a trigger event is detected, the process retrieves an RPA bot script associated with trigger event. In some embodiments, the process checks the metadata of the bot script to determine if any parameters are needed to complete this task. If any parameters are needed, the process determines if the parameters have been provided, for example in the request message or in data available to the bot script. If any parameters are needed and not provided, the process generates a request for the necessary parameters. For example, in some embodiments, the process generates an email or IM using a designated template to request the parameters. Once the requested parameters have been received, the process performs the bot script.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved secure debugging module 200 that prevents sensitive data from being leaked with debugging data. In addition to secure debugging module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and secure debugging module 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in secure debugging module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices.

Operating system 122 may take several forms, such as various known proprietary operating systems or open-source Portable Operating System Interface-type operating systems that employ a kernel. The code included in secure debugging module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
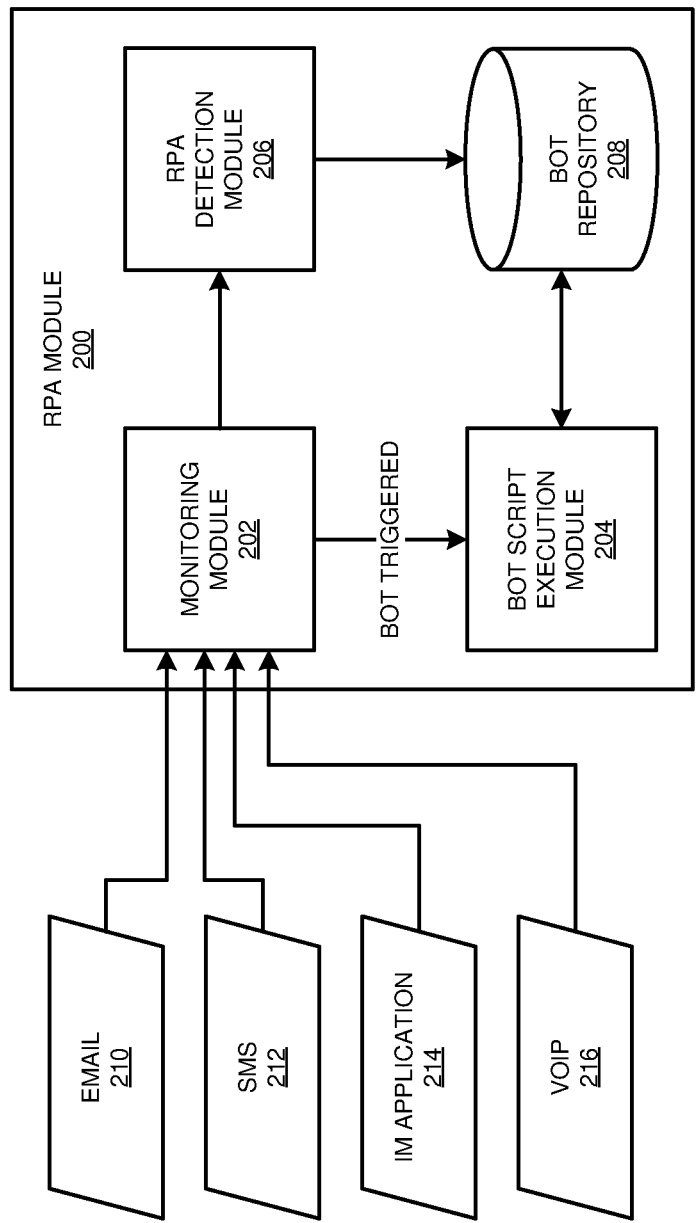
FIG. 2 depicts a functional block diagram of an exemplary RPA module in accordance with an illustrative embodiment.

With reference to FIG. 2, this figure depicts a functional block diagram of an exemplary RPA module 200 in accordance with an illustrative embodiment. In the illustrated embodiment, the RPA module 200 receives and monitors multiple communication channels for messages that may be potential triggers for a repetitive process performed by a user that can be automated as an RPA bot script.

In the illustrated embodiment, the RPA module 200 includes a monitoring module 202, a bot script execution module 204, an RPA detection module 206, and a bot repository 208. In alternative embodiments, the RPA module 200 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the monitoring module 202 monitors incoming communication messages. A "communication message," as referred to herein, may refer to any form of information conveyance made to a user. For example, a communication message may be in the form of a voice over Internet Protocol (VOIP) call, a Short Message Service (SMS) text message (or Multimedia Messaging Service (MMS) message), an instant message (IM), an email, and so on. Each incoming communication may be received by a particular communication channel based on the medium of the incoming communication. As used herein, a "communication channel" (or colloquially, just "channel") may refer to an interface that is designed to receive communications over a specific medium. For example, a communication channel to facilitate email 210 may involve a simple mail transfer protocol (SMTP) server configured to receive emails sent to a designated email address, a communication channel to facilitate SMS 212 may involve an SMS gateway configured to receive SMS messages sent over a telecommunications network to a designated phone address. A communication channel to facilitate an IM application 214 may involve an Internet relay chat (IRC) server configured to receive chat messages sent over a network. A communication channel to facilitate VOIP 216 may involve an automatic call distributor (ACD) service configured to receive calls sent over a telecommunications network to a designated phone address. Notably, other types of communications and communication channels may be included in an actual implementation, devices to facilitate communication channels may exist for conveying communication messages are shown in FIG. 2. In particular, communication channels include channels for email 210, SMS (text messages) 212, IM application(s) 214, and/or VOIP 216.

In exemplary embodiments, there are several techniques that the monitoring module 202 may use to garner the content of a communication message in order to detect a trigger event for an existing bot script or a potential trigger event for a new bot script. In some embodiments, the content of the communication message may be provided. For instance, during a voice communication, via an interface on a telephonic device, a caller may enter an input (such as pressing a key) to indicate the content of the voice communication (also known as an interactive voice response (IVR) system). In the case of an email communication, the receiving user may have multiple different email addresses designated for different issues.

In some embodiments, the monitoring module 202 includes one or more algorithms to parse or classify incoming communications to deduce content and thereby detect a trigger event for an existing bot script or a potential trigger event for a new bot script. In some embodiments, the monitoring module 202 performs natural language processing (NLP), for example using a natural language parser that processes unstructured, natural language text of a communication message to identify words and dependencies (syntactic and/or semantic relations) between words of the text. In some embodiments, the monitoring module 202 analyzes incoming communication messages to identify requests or instructions using NLP classification. For example, in some embodiments, the monitoring module 202 uses a binary NLP classification process to classify incoming messages as having an instruction classification or as not having an instruction classification. Thus, an instruction classification refers to a classification of a communication message that identifies the message as being a type of request or other such instruction to perform a task.

In some embodiments, the monitoring module 202 uses an NLP classification process to classify incoming messages as having one or more of several possible classifications, where the several possible classifications include an instruction classification. In some embodiments, the natural language processing classifies the natural language text of a communication message and assigns one or more class labels to the communication message. The classes may be selected from a predefined set of classes that have previously been identified as a trigger event for an existing bot script and/or one or more classes that categorize the communication message as a request that the recipient perform some task, making the communication message a potential trigger event if the task can be automated using RPA. Classes may have subclasses. For example, a class that triggers a bot script may have a subclass that is indicative of whether the communication message includes a parameter that is required for the task. An NLP classifier may be trained to recognize communication messages that include a request or other such instruction, for example using training data that includes messages having language that is (or is not) typically indicative of an instruction to perform a task.

In some embodiments, monitoring module 202 includes a rule-based classification technique that applies a set of grammar rules to the communication message processed and, depending on the output of the applied rules, determines a class. The rules may include patterns that, when met by text of a communication message, returns a class and/or subclass for the communication message. In some embodiments, the monitoring module 202 includes a probabilistic classifier model (or models) trained to output a class based on the communication message. In some such embodiments, the probabilistic classifier model has been trained on a set of training communication messages that are each manually labeled with a respective one of the set of class labels.

In some embodiments, the monitoring module 202 divides incoming messages that have the instruction classification into groups or clusters according to the task that the communication message is instructing or requesting. For example, a user may receive communication messages requesting or instructing the user to perform one of several possible tasks. The monitoring module 202 identifies the types of requests or instructions in each communication message that is classified as an instruction message and groups each message in one of several clusters, where each cluster corresponds with one of the several possible tasks. In some embodiments, the clustering includes k-means clustering using cosine similarity to identify messages that are not worded the same, but have semantically similar meanings.

In the illustrated embodiment, the bot script execution module 204 receives a trigger event from the monitoring module 202, associates the trigger event with a bot script stored in the bot repository 208. A "bot script" refers to program instructions executable by a processor to cause the processor to perform a predefined sequence of operations, which typically include user operations that have been automated. A "bot" as used herein refers to a software application that performs such automated tasks defined by the bot script. A "trigger event" as used herein refers to an occurrence that is associated with a particular bot script and causes a bot to initiate that bot script. In some embodiments, the bot repository 208 stores one or more bot scripts that may be initiated by the bot script execution module 204 in response to associated trigger events.

In some cases, a trigger event may be relatively simple or straightforward. For example, a form on a website may be configured such that each time a visitor submits the form, an email is sent to a particular email address, the subject of the email is a particular phrase that is always the same, and the body of the email is always formatted a particular way. A trigger event for an RPA bot script for processing the form data in such emails can easily be established since the email is so easily recognized, for example as a rule-based trigger that triggers a bot in response to the predictable email subject line.

However, in other cases, it can be very difficult for a user to define a trigger event that will capture that will reliably trigger a bot script without significant numbers of misses or false positives. For example, suppose a user frequently receives communication messages that are requests to manually create user accounts on a demo server that allows users to evaluate a server application, and the task of manually creating the user accounts is capable of being performed by an RPA bot script. However, the user receives the requests from several different sources, e.g., from potential customers, engineering, sales, etc., through several different channels, e.g., via email, IM, SMS, etc., and with no standard words or phrases in the requests. As a result, the user is faced with a technical problem when trying to define a rule that would automatically trigger an RPA bot script in response to such requests. There is no combination of sender/channel/words/phrases that would identify all of the requests and not also incorrectly identify other unrelated messages.

The illustrated embodiment includes an RPA detection module 206 that addresses and provides a solution to this technical problem. The RPA detection module 206 applies one or more data processing techniques of varying degrees of complexity to identify and define a trigger event for a bot script. In some embodiments, the RPA detection module 206 uses natural language processing and/or machine-learning techniques to define a trigger event based on semantic similarities among the different communication messages despite there being various different message types, formats, and content. This would allow a user, such as in the example above, to use RPA automation for a task that otherwise may not have been possible.

Figure 3:
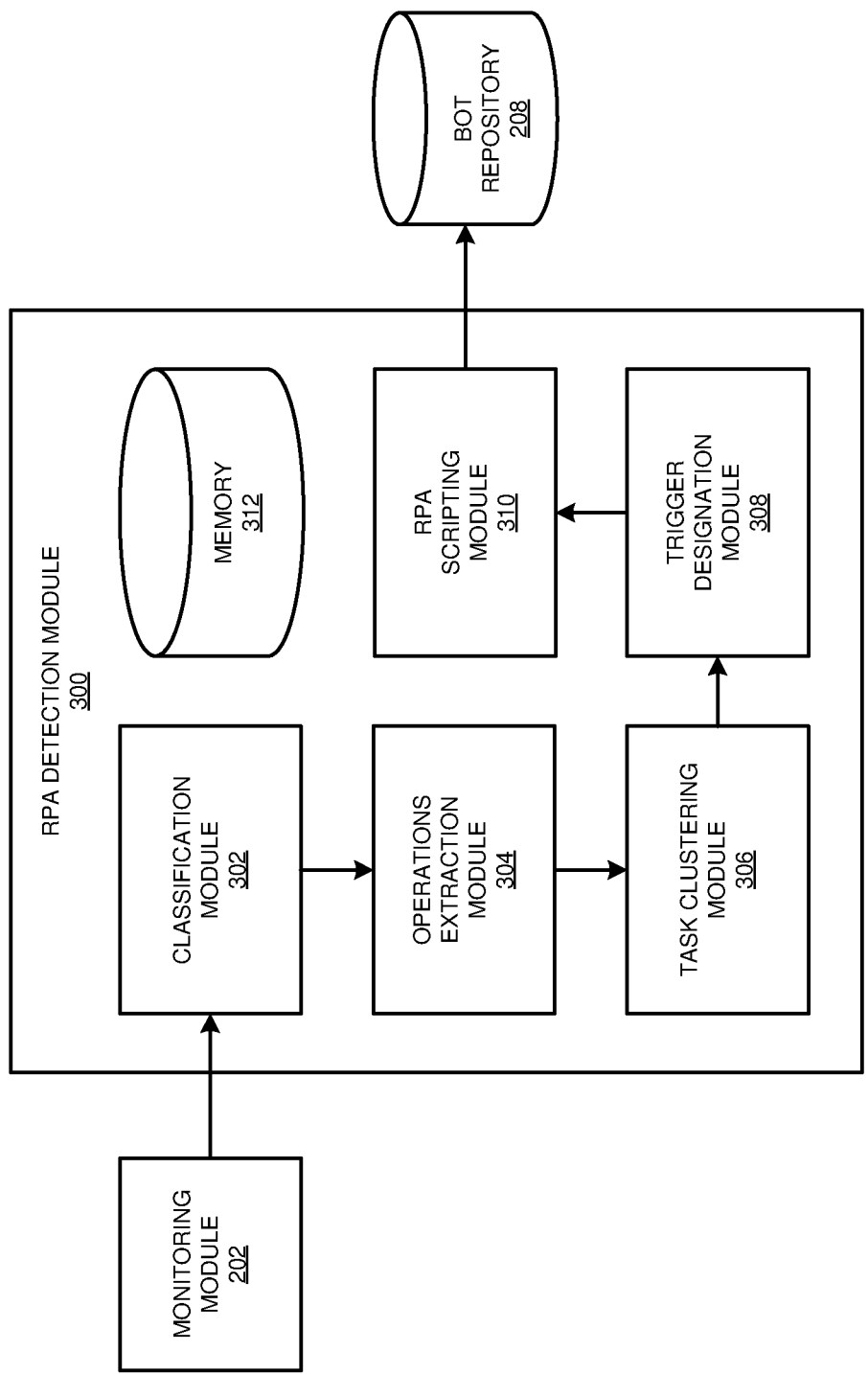
FIG. 3 depicts a functional block diagram of an RPA detection module in accordance with an illustrative embodiment.

With reference to FIG. 3, this figure depicts a functional block diagram of an RPA detection module 300 in accordance with an illustrative embodiment. In the illustrated embodiment, the RPA detection module 300 is an example of the RPA detection module 206 of FIG. 2.

In the illustrated embodiment, the RPA detection module 300 includes a classification module 302, an operations extraction module 304, a task clustering module 306, a trigger designation module 308, an RPA scripting module 310, and a memory 312. In alternative embodiments, the RPA detection module 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

Continuing with the example described above in connection with FIG. 2, suppose that in addition to frequently receiving communication messages that are requests to manually create user accounts on a demo server, the user also frequently receives communication messages that are requests to update client profiles on a corporate intranet, which is another task that is capable of being performed by an RPA bot script. However, as with the requests for new user accounts on the demo server, the requests to update client profiles arrive from several different sources, through several different channels, and with no standard words or phrases in the requests. In this and other such scenarios, the classification module 302 will analyze incoming communication messages to identify requests or instructions, for example using NLP classification to identify messages having an instruction classification. The classification module 302 will then identify clusters of similar requests as the requests are received over some period of time. In some embodiments, the clustering includes k-means clustering using cosine similarity to identify messages that are not worded the same, but have semantically similar meanings. So, in the exemplary scenario, the classification module 302 will gradually identify a first cluster for demo-server requests and identify a second cluster for client-profile requests.

In some embodiments, once the classification module 302 identifies that a cluster has matured to a specified size, the classification module 302 notifies the operations extraction module 304 of the matured cluster. In some embodiments, the specified size may be a specified threshold, such as a threshold value specified by a user or system administrator. In some embodiments, the classification module 302 may perform statistical significance calculations to determine specified sizes the clusters much reach for maturity. When an incoming communication message is classified as a request and clustered into a matured cluster, the operations extraction module 304 will monitor user actions subsequent to receipt of the message. The operations extraction module 304 will generate a workflow dataset representative of the user operations for each monitored request. Thus, a workflow dataset may include any type of data in a format that is recognizable by the RPA detection module 300 as a series of user operations that may be used as the basis for a bot script that mimics the series of user operations. Examples of such user operations include user inputs made via a keyboard, a mouse, a microphone, a touchscreen, or any other type of sensor or user input device. In some embodiments, the user operations and associated workflow datasets may differ somewhat after each new request in the matured cluster, for example due to anomalous user operations unrelated to the requested task.

In some embodiments, the operations extraction module 304 uses a task mining technique to extract user operations as workflow datasets. Various task mining techniques are known that monitor multiple iterations of user operations (where each iteration is responsive to a respective request) and gradually identify a core series of user operations that are performed in response to communication messages clustered with the matured cluster.

In the illustrated embodiment, the workflow datasets are provided to a task clustering module 306. As described above in the exemplary scenario, the user receives communication messages that are requests to manually create user accounts on a demo server from several different sources, through several different channels, and with no standard words or phrases in the requests. As a result, there may be significant differences between two or more groups of the demo-server requests. For example, one department may transmit requests via email using formal language, whereas another department transmits requests via an IM application using more informal language. In some cases, the disparate differences between such groups of messages may cause the classification module 302 to create two or more clusters for the same type of request and associated task.

Suppose the classification module 302 creates two clusters for demo-server requests due to significant differences in the groups of requests. These two clusters will then be processed separately by the operations extraction module 304 as described above. From the user's perspective, the task is the same regardless of the distinctions between the requests that are being clustered separately. Thus, the workflow datasets generated by the operations extraction module 304 will be similar for both clusters.

The workflows generated by the operations extraction module 304 are analyzed by the task clustering module 306 and grouped into task clusters using clustering techniques. In the above scenario, since the workflow datasets for the two request clusters in the classification module 302 are similar or the same, the task clustering module 306 will cluster the workflow datasets together in a single task cluster. At this point, the task clustering module 306 will recognize that the classification module 302 generated multiple request clusters for the same task cluster. This allows the task clustering module 306 to consolidate the workflow datasets of the two groups of requests that are both for the same task but have been processed separately by the operations extraction module 304. This clustering of workflow datasets into a task cluster by the task clustering module 306 allows the RPA detection module 300 to avoid creation of redundant bot scripts for the same task.

In some embodiments, the task clustering module 306 notifies the classification module 302 of the multiple request clusters for the same task. In some such embodiments, the classification module 302 learns from the information received from the task clustering module 306 and adjusts the request clustering criteria accordingly. For example, in some embodiments, the classification module 302 uses a natural language corpus stored in memory 312 with cosine similarity for determining similarity between words or phrases. In some such embodiments, the classification module 302 modifies the natural language corpus based on the information received from the task clustering module 306 such that the updated corpus includes additional similarity data that indicates similarities between the request messages that the classification module 302 initially clustered separately.

In the illustrated embodiment, once the operations extraction module 304 has processed a threshold number of request messages, and the resulting workflow datasets have been grouped into a task cluster by the task clustering module 306, the task cluster data is provided to the trigger designation module 308. The trigger designation module 308 generates trigger event data based on the clustering criteria used by the classification module 302 for clustering the requests. The workflow information from the task cluster and the trigger event data are provided to the RPA scripting module 310. The RPA scripting module 310 then generates an RPA bot script that comprises program instructions executable by a processor to cause the processor to perform operations that automate the user operations represented by the workflow dataset from the task cluster, where the operations are triggered by the trigger event data that is based on the request clustering criteria used by the classification module 302. The RPA scripting module 310 then deploys the RPA bot script to the bot repository 208.

Figure 4:
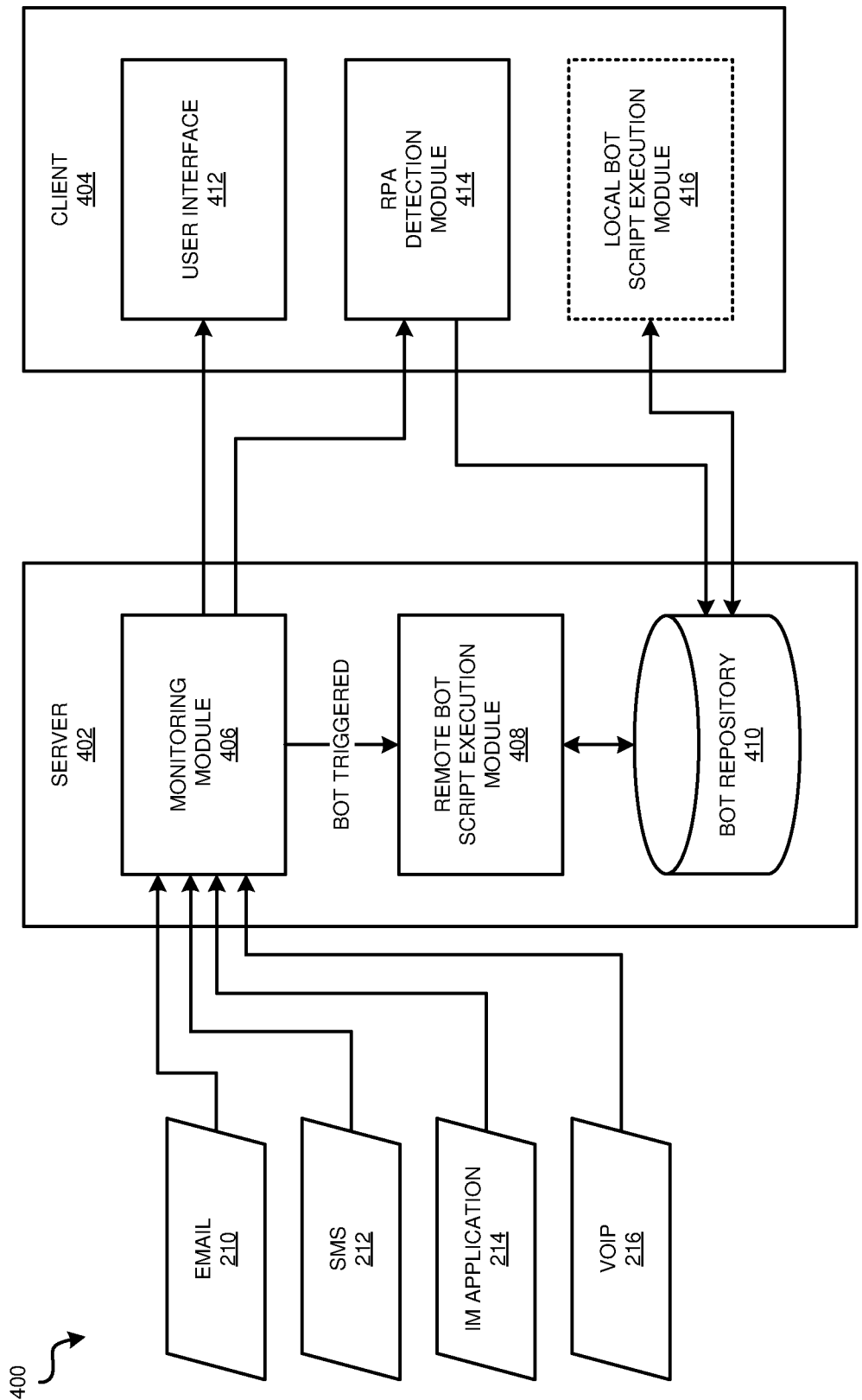
FIG. 4 depicts a functional block diagram of a computing environment in accordance with an illustrative embodiment.

With reference to FIG. 4, this figure depicts a functional block diagram of a computing environment 400 in accordance with an illustrative embodiment. In the illustrated embodiment, the computing environment 400 includes a server 402 and a client 404, with the client 404 including an RPA detection module 414. In some embodiments, the RPA detection module 414 is an example of the RPA detection module 300 of FIG. 3.

In the illustrated embodiment, the server 402 includes a monitoring module 406, a remote bot script execution module 408, and a bot repository 410. The client 404 includes the RPA detection module 414 and optionally a local bot script execution module 416. In alternative embodiments, the computing environment 400 can include some or all of the functionality described herein but grouped differently into one or more modules, servers, clients, or other devices. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, such as described in connection with FIG. 2, once an RPA bot script is deployed, it operates on the same user's device where it was generated. In such embodiments, the RPA bot script is triggered by communication messages as they are received by the user's device.

In the embodiment shown in FIG. 4, an RPA bot script is generated by the RPA detection module 414 on the client 404, and is then deployed to the server 402. The server 402 includes a monitoring module 406. The monitoring module 406 is an example of the monitoring module 202 of FIGS. 2 and 3 deployed on a remote server. When the monitoring module 406 detects a trigger event, it notifies the remote bot script execution module 408. The remote bot script execution module 408 retrieves the bot script associated with the trigger event from the bot repository 410 and executes the bot script from the server 402.

It will be noted that the communication channels that provide email 210, SMS 212, IM application 214, and VOIP 216 to the client 404 are relayed by the monitoring module 406 at the server 402 to the user interface 412, where the user can read and respond to communication messages. In some embodiments, when the monitoring module 406 detects a bot is triggered by a request in a communication message, the monitoring module 406 intercepts or halts the communication message at the server rather than relaying it to the client 404. In some embodiments, this functionality is optionally enabled by a user to reduce inbox clutter and distractions caused by communication messages that are requests that are being handled by the remote bot script execution module 408 at the server 402. In some embodiments, the monitoring module 406 maintains logs of halted/intercepted messages and actions performed by the remote bot script execution module 408 in response to the halted/intercepted messages.

In some embodiments, the client 404 includes the optional local bot script execution module 416. This option allows some bot scripts to be performed at the client 404 and other bot scripts to be performed at the server 402. In some such embodiments, one or more of the bot scripts includes metadata indicating where the bot script should be run (i.e., at the server 402, at the client 404, etc.).

Figure 5:
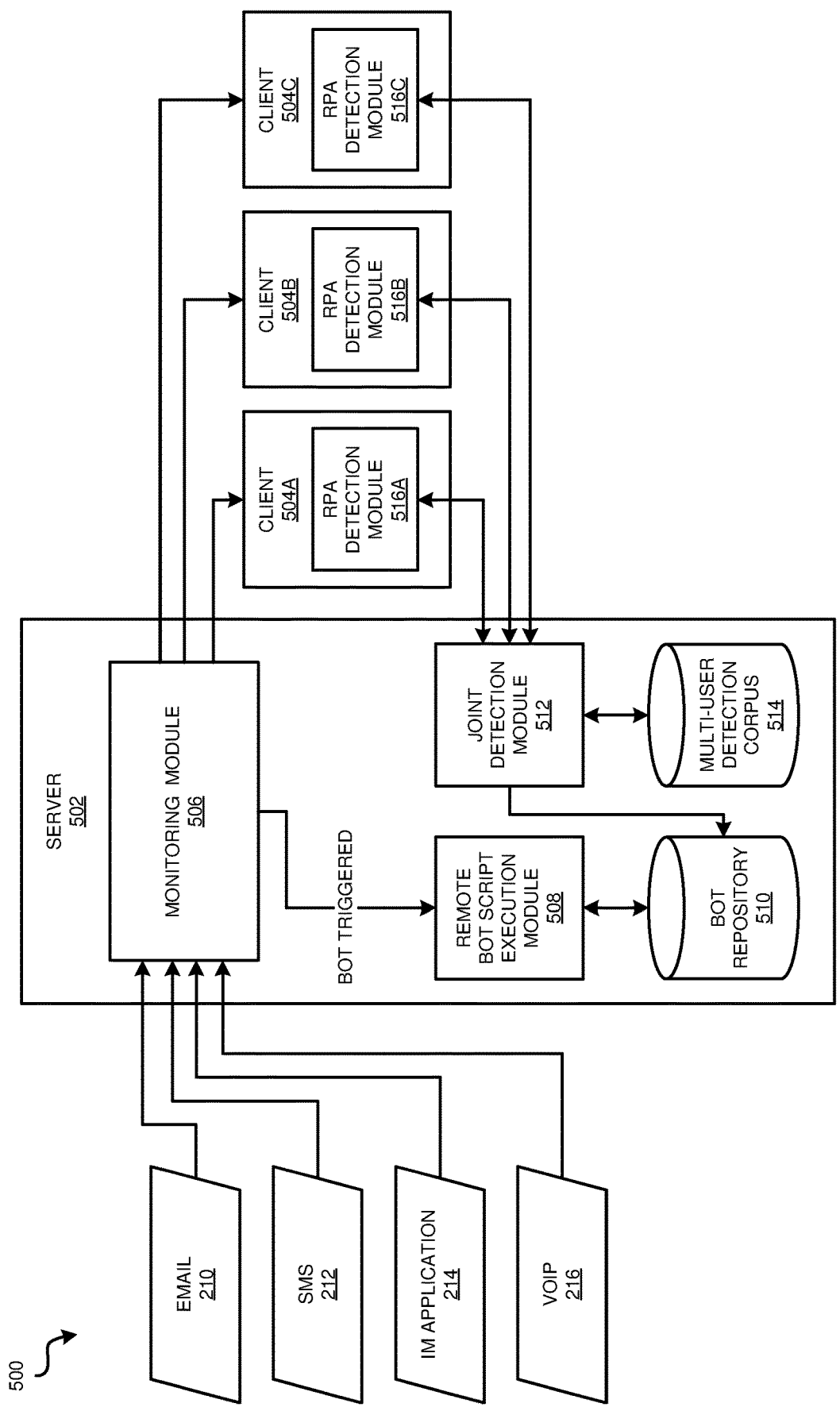
FIG. 5 depicts a functional block diagram of a computing environment in accordance with an illustrative embodiment.

With reference to FIG. 5, this figure depicts a functional block diagram of a computing environment 500 in accordance with an illustrative embodiment. In the illustrated embodiment, the computing environment 500 includes a server 502 and a plurality of clients 504A-504C, with the clients 504A-504C including respective RPA detection modules 516A-516C. In some embodiments, the RPA detection modules 516A-516C are examples of the RPA detection module 300 of FIG. 3.

In the illustrated embodiment, the server 502 includes a monitoring module 506, a remote bot script execution module 508, a bot repository 510, a joint detection module 512, and a 514. In an embodiment, the monitoring module 506 is an example of the monitoring module 406 of FIG. 4, and the remote bot script execution module 508 is an example of the remote bot script execution module 408 of FIG. 4. In alternative embodiments, the server 502 can include some or all of the functionality described herein but grouped differently into one or more modules, servers, clients, or other devices. In some embodiments, the functionality described herein is distributed among a plurality of systems, which can include combinations of software and/or hardware-based systems, for example Application-Specific Integrated Circuits (ASICs), computer programs, or smart phone applications.

In a scenario described above in connection with FIG. 2, a user receives communication messages that are requests to manually create user accounts on a demo server. In a variation of that scenario, suppose a group of users (rather than only a single user) receive communication messages that have such demo-server requests. An embodiment such as the computing environment 500 allows a bot script to be generated as described above in connection with FIG. 3, except that data is shared to some degree by the clients 504A-504C. For example, in some embodiments, request clustering is performed at the clients 504A-504C, which all provide request data to the joint detection module 512. The joint detection module 512 then performs the functionality described above in connection with the operations extraction module 304, task clustering module 306, trigger designation module 308, and RPA scripting module 310. In some such embodiments, the task clustering performed by the joint detection module 512 consolidates corpus data from the clients 504A-504C that is used for request clustering and stores the consolidated corpus data in the multi-user detection corpus 514. In some embodiments, the consolidates corpus data is also provided to the 504A-504C to allow for updating of the individual RPA detection modules 516A-516C.

Figure 6:
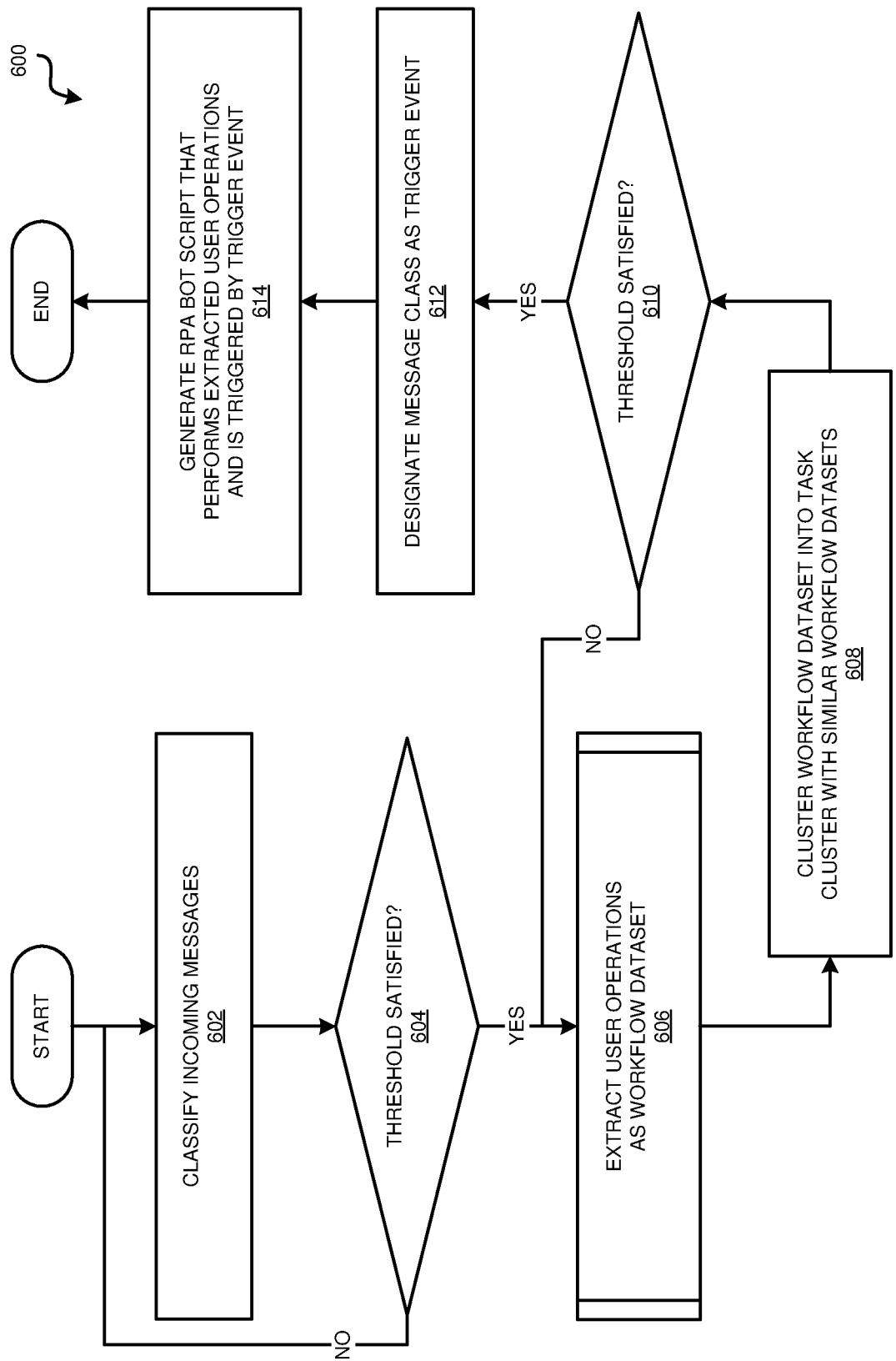
FIG. 6 depicts a flowchart of an example process for automatic detection of robotic process automation trigger events in accordance with an illustrative embodiment.

With reference to FIG. 6, this figure depicts a flowchart of an example process 600 for automatic detection of robotic process automation trigger events in accordance with an illustrative embodiment. In a particular embodiment, the RPA module 200 carries out the process 600.

At block 602, the process classifies incoming messages. For example, in some embodiments, the process will analyze incoming communication messages to identify requests, for example using NLP classification. The process will then identify clusters of similar requests as the requests are received over some period of time. In some embodiments, the clustering includes k-means clustering using cosine similarity to identify messages that are not worded the same, but have semantically similar meanings.

Next, at block 604, the process determines whether a specified threshold has been satisfied. For example, in some embodiments, the specified threshold may be a specified cluster size, such as a threshold size specified by a user or system administrator. In some embodiments, the process may perform statistical significance calculations to determine specified threshold sizes the clusters much reach for maturity. If the threshold has been satisfied, the process continues to block 606; otherwise, the process returns to block 602.

Next, at block 606, the process extracts user operations as workflow dataset. For example, when an incoming communication message is classified as a request and clustered into a matured cluster, the process will monitor user actions subsequent to receipt of the message. The process will generate a workflow dataset representative of the user operations for each monitored request. In some embodiments, the user operations and associated workflow datasets may differ somewhat after each new request in the matured cluster, for example due to anomalous user operations unrelated to the requested task.

In some embodiments, the process uses a task mining technique to extract user operations as workflow datasets. Various task mining techniques are known that monitor multiple iterations of user operations (where each iteration is responsive to a respective request) and gradually identify a core series of user operations that are performed in response to communication messages clustered with the matured cluster.

Next, at block 608, the process clusters workflow datasets into a task cluster with similar workflow datasets. In some embodiments, the process analyzes the workflows and groups them into task clusters using clustering techniques. At this point, the process will recognize any duplicated request clusters and consolidate them into a single task cluster.

Next, at block 610, the process determines whether a threshold number of request messages, and the resulting workflow datasets, have been grouped into a task cluster. If so, the process continues to block 612; otherwise, the process returns to block 606.

Next, at block 612, the process designates a message class as a trigger event, and at block 614, the process generates an RPA bot script that performs extracted user operations and is triggered by trigger event. For example, in some embodiments, the process generates trigger event data based on the clustering criteria used for clustering the requests. The workflow information from the task cluster and the trigger event data are used to generate an RPA bot script that comprises program instructions executable by a processor to cause the processor to perform operations that automate the user operations represented by the workflow dataset from the task cluster, where the operations are triggered by the trigger event data that is based on the request clustering criteria. The process then deploys the RPA bot script, for example to a bot repository.

Figure 7:
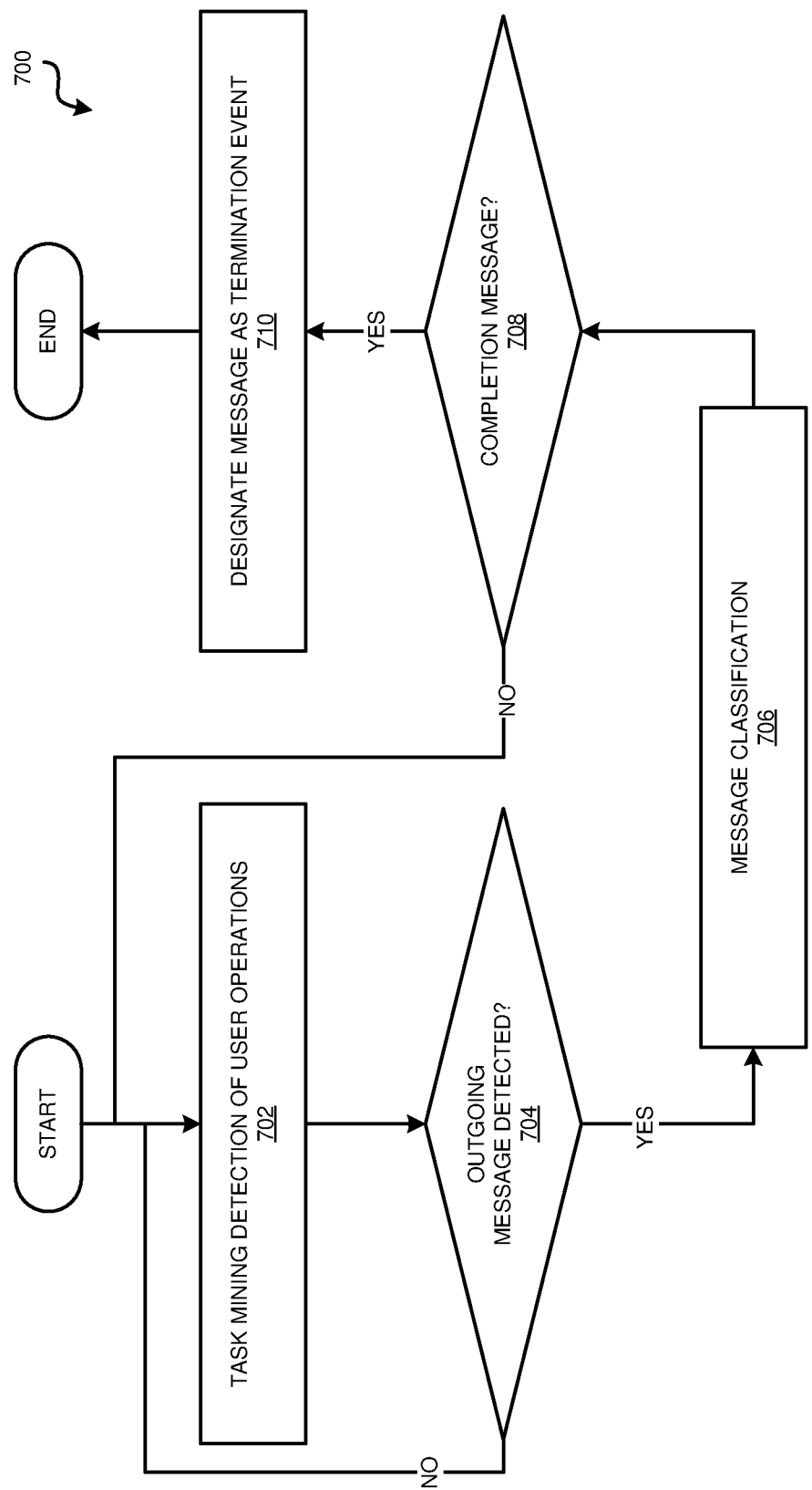
FIG. 7 depicts a flowchart of an example process for extracting user operations in accordance with an illustrative embodiment.

With reference to FIG. 7, this figure depicts a flowchart of an example process 700 for extracting user operations in accordance with an illustrative embodiment. In a particular embodiment, the process 700 is carried out at block 606 of the process 600 in FIG. 6.

At blocks 702 and 704, the process uses a task mining technique to extract user operations as workflow datasets, while specifically monitoring for the user to send an outgoing message. If an outgoing message is detected ("YES" at block 704), the process continues to block 706.

At blocks 706 and 708, the process will analyze the outgoing communication message to identify whether it is a completion message, meaning a message from the user that appears to convey an indication that a requested task has been completed. For example, in some embodiments, the process uses NLP classification to determine if the message is classified as a completion message. If it is not a completion message, the process returns to block 702. Otherwise, the process continues to block 710. At block 710, the process designates the outgoing message as termination event.

Figure 8:
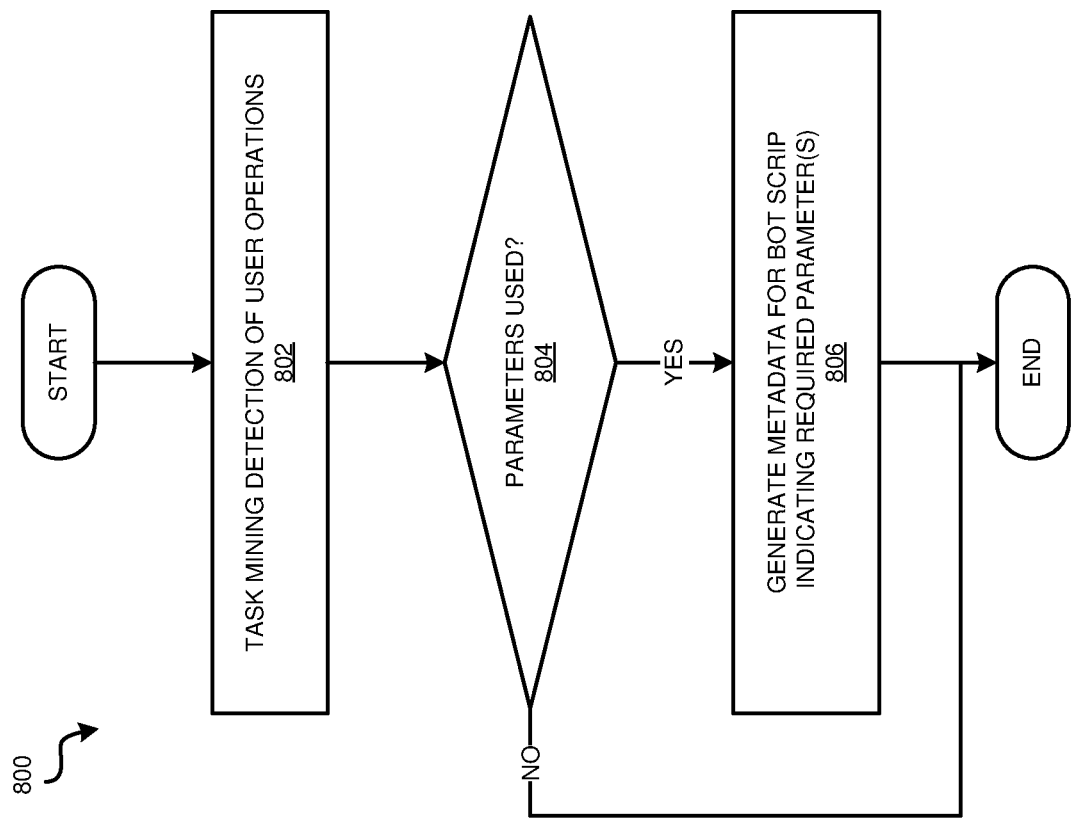
FIG. 8 depicts a flowchart of an example process for extracting user operations in accordance with an illustrative embodiment.

With reference to FIG. 8, this figure depicts a flowchart of an example process 800 for extracting user operations in accordance with an illustrative embodiment. In a particular embodiment, the process 800 is carried out at block 606 of the process 600 in FIG. 6.

At blocks 802 and 804, the process uses a task mining technique to extract user operations as workflow datasets, while specifically monitoring for the user to use one or more parameters at any of the extracted operations. For example, if the task is creating a new user account, the parameters may include the user's name, email address, and phone number that are needed to create the account. Thus, the parameters may be any type of information that is needed to complete the task. If parameters are detected, then at block 806 the process generates metadata for the bot script indicating that one or more parameters are required.

Figure 9:
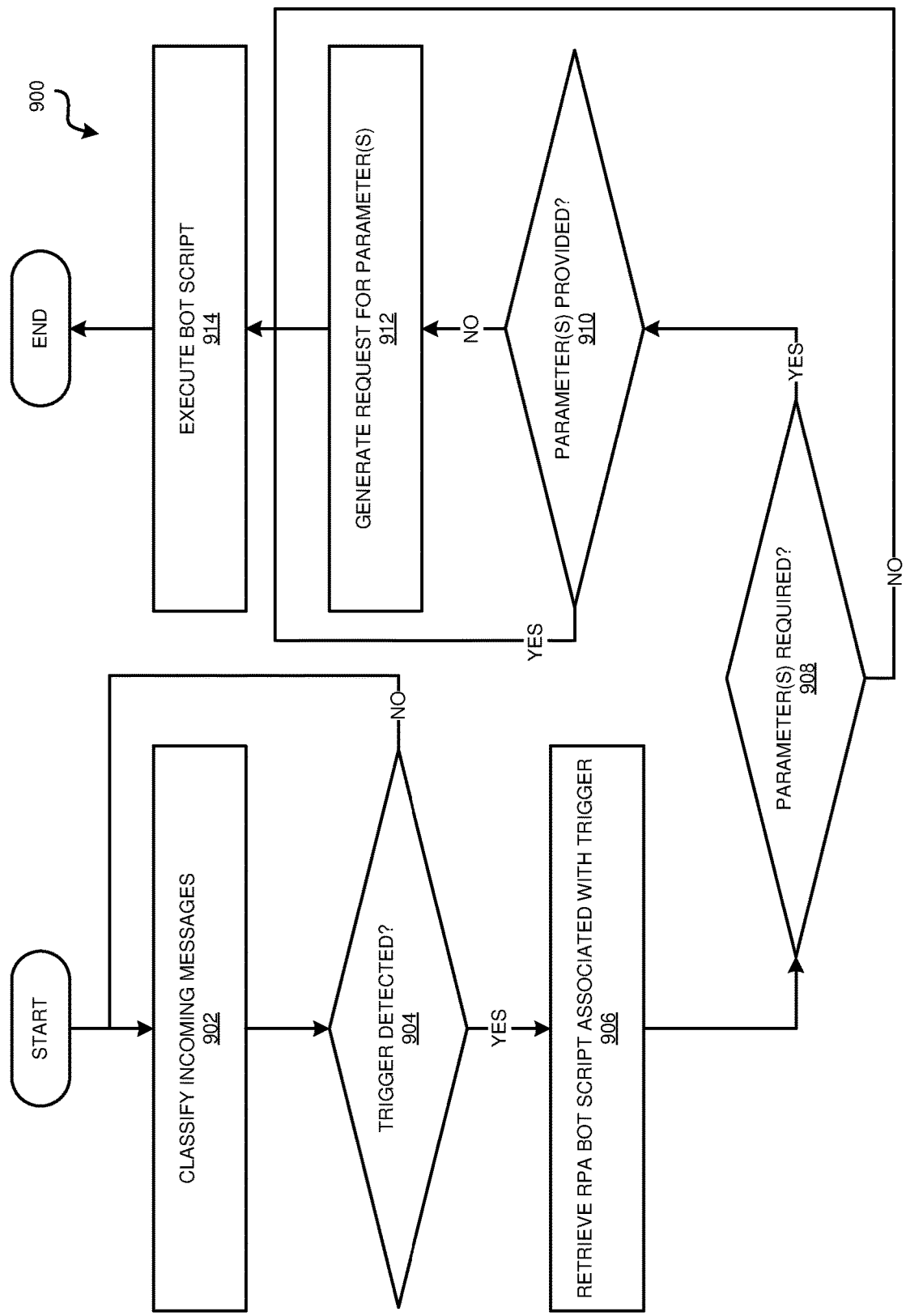
FIG. 9 depicts a flowchart of an example process for executing a deployed RPA bot script in accordance with an illustrative embodiment.

With reference to FIG. 9, this figure depicts a flowchart of an example process 900 for executing a deployed RPA bot script in accordance with an illustrative embodiment. In a particular embodiment, the server 402 or 502 or a client 404 or 504 carries out the process 900.

At blocks 902 and 904, the process classifies incoming messages. For example, in some embodiments, the process will analyze incoming communication messages to identify requests that match a trigger event associated with a deployed bot script. If a trigger event is detected ("YES" at block 904), the process continues to block 906. At block 906 the process retrieves an RPA bot script associated with trigger event. At block 908, the process checks the metadata of the bot script to determine if any parameters are needed to complete this task. If not, the process executes the bot script at block 914. If any parameters are needed, the process determines at block 910 if the parameters have been provided, for example in the request message or in data available to the bot script. If so, the process executes the bot script at block 914. If any parameters are needed and not provided ("NO" at block 910), the process generates a request for the necessary parameters. For example, in some embodiments, the process generates an email or IM using a designated template to request the parameters. Once the requested parameters have been received, the process performs the bot script at block 914. Once the bot script is completed at 914, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting, in a data communication channel being monitored by a software-implemented monitoring module (monitoring module) executing within a Robotic Process Automation (RPA) application, a first incoming communication message;
   classifying, through the execution of a Natural Language Processing (NLP) operation implemented in an RPA detection module executing within the RPA application, the first incoming communication message as having an instruction classification based at least in part on a first NLP analysis of natural language text of the first incoming communication message, wherein the first incoming communication message is addressed to a first user;
   extracting, responsive to classifying the first incoming communication message as having the instruction classification, user operations as a workflow dataset;
   clustering the workflow dataset into a task cluster with other similar workflow datasets representative of previously extracted user operations;
   designating the instruction classification as a trigger event based at least in part on the first NLP analysis;
   causing, responsive to receiving the trigger event as an input at a software-implemented scripting module (scripting module) executing within the RPA application, the scripting module to generate an RPA bot script that comprises program instructions executable by a processor to cause the processor to perform operations that automate the user operations in response to the trigger event; and
   causing, responsive to a second incoming communication from a second user lacking a parameter associated with the user operations, an execution of a portion of the RPA bot script, the execution performing an automated sending operation of a request message to the second user.

2. The method of claim 1, further comprising:
   classifying, subsequent to the user operations, an outgoing communication message from the first user as a completion message based at least in part on a second NLP analysis of natural language text of the outgoing communication message.

3. The method of claim 2, further comprising:
   designating the completion message as a termination event based at least in part on the second NLP analysis.

4. The method of claim 3, wherein the generating of the RPA bot script comprises generating the RPA bot script to further comprise program instructions that terminate the RPA bot script after the termination event.

5. The method of claim 1, wherein the extracting of the user operations is performed using a task-mining algorithm.

6. The method of claim 1, wherein the extracting of the user operations comprises extracting an indication of the parameter associated with the user operations.

7. The method of claim 6, further comprising:
   determining that the second incoming communication message has the instruction classification and lacks a parameter value for the parameter associated with the user operations.

8. The method of claim 7, further comprising:
   determining that the second incoming communication message is from the second user.

9. The method of claim 1, further comprising:
   intercepting a second incoming communication message having the instruction classification prior to delivery to the first user and triggering the RPA bot script.

10. The method of claim 1, wherein the classifying of the first incoming communication message comprises performing a classification based on a cosine similarity.

11. A computer program product comprising one or more computer readable storage media, and program instructions collectively stored on the one or more non-transitory computer readable storage media, the program instructions executable by a processor to cause the processor to perform operations comprising:
    detecting, in a data communication channel being monitored by a software-implemented monitoring module (monitoring module) executing within a Robotic Process Automation (RPA) application, a first incoming communication message;
    classifying, through the execution of a Natural Language Processing (NLP) operation implemented in an RPA detection module executing within the RPA application, the first incoming communication message as having an instruction classification based at least in part on a first NLP analysis of natural language text of the first incoming communication message, wherein the first incoming communication message is addressed to a first user;
    extracting, responsive to classifying the first incoming communication message as having the instruction classification, user operations as a workflow dataset;
    clustering the workflow dataset into a task cluster with other similar workflow datasets representative of previously extracted user operations;
    designating the instruction classification as a trigger event based at least in part on the first NLP analysis;
    causing, responsive to receiving the trigger event as an input at a software-implemented scripting module (scripting module) executing within the RPA application, the scripting module to generate an RPA bot script that comprises program instructions executable by a processor to cause the processor to perform operations that automate the user operations in response to the trigger event; and causing, responsive to a second incoming communication from a second user lacking a parameter associated with the user operations, an execution of a portion of the RPA bot script, the execution performing an automated sending operation of a request message to the second user.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, the operations further comprising:
classifying, subsequent to the user operations, an outgoing communication message from the first user as a completion message based at least in part on a second NLP analysis of natural language text of the outgoing communication message.

15. The computer program product of claim 14, the operations further comprising:
designating the completion message as a termination event based at least in part on the second NLP analysis.

16. The computer program product of claim 15, wherein the generating of the RPA bot script comprises generating the RPA bot script to further comprise program instructions that terminate the RPA bot script after the termination event.

17. A computer system comprising a processor and one or more computer readable storage media, and program instructions collectively stored on the one or more computer readable storage media, the program instructions executable by the processor to cause the processor to perform operations comprising:
detecting, in a data communication channel being monitored by a software-implemented monitoring module (monitoring module) executing within a Robotic Process Automation (RPA) application, a first incoming communication message;
classifying, through the execution of a Natural Language Processing (NLP) operation implemented in an RPA detection module executing within the RPA application, the first incoming communication message as having an instruction classification based at least in part on a first NLP analysis of natural language text of the first incoming communication message, wherein the first incoming communication message is addressed to a first user;
extracting, responsive to classifying the first incoming communication message as having the instruction classification, user operations as a workflow dataset;
clustering the workflow dataset into a task cluster with other similar workflow datasets representative of previously extracted user operations;
designating the instruction classification as a trigger event based at least in part on the first NLP analysis;
causing, responsive to receiving the trigger event as an input at a software-implemented scripting module (scripting module) executing within the RPA application, the scripting module to generate an RPA bot script that comprises program instructions executable by a processor to cause the processor to perform operations that automate the user operations in response to the trigger event; and
causing, responsive to a second incoming communication from a second user lacking a parameter associated with the user operations, an execution of a portion of the RPA bot script, the execution performing an automated sending operation of a request message to the second user.

18. The computer system of claim 17, the operations further comprising:
classifying, subsequent to the user operations, an outgoing communication message from the first user as a completion message based at least in part on a second NLP analysis of natural language text of the outgoing communication message.

19. The computer system of claim 18, the operations further comprising:
designating the completion message as a termination event based at least in part on the second NLP analysis.

20. The computer system of claim 19, wherein the generating of the RPA bot script comprises generating the RPA bot script to further comprise program instructions that terminate the RPA bot script after the termination event.

* * * * *